(12) United States Patent
Park et al.

(10) Patent No.: US 11,563,836 B2
(45) Date of Patent: Jan. 24, 2023

(54) ELECTRONIC DEVICE WITH CYLINDRICAL BATTERY

(71) Applicant: LG ELECTRONICS INC., Seoul (KR)

(72) Inventors: Kyungui Park, Seoul (KR); Sunggu Kang, Seoul (KR); Sanggyu Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 126 days.

(21) Appl. No.: 17/006,686

(22) Filed: Aug. 28, 2020

(65) Prior Publication Data

US 2021/0367220 A1 Nov. 25, 2021

(30) Foreign Application Priority Data

May 22, 2020 (KR) .......... 10-2020-0061452

(51) Int. Cl.
| | | |
|---|---|---|
| *H04M 1/02* | (2006.01) | |
| *H01M 10/653* | (2014.01) | |
| *H01M 10/6552* | (2014.01) | |
| *H01M 10/643* | (2014.01) | |
| *H01M 50/213* | (2021.01) | |

(52) U.S. Cl.
CPC ....... *H04M 1/0262* (2013.01); *H01M 10/643* (2015.04); *H01M 10/653* (2015.04); *H01M 10/6552* (2015.04); *H04M 1/0266* (2013.01); *H01M 50/213* (2021.01); *H04M 1/0264* (2013.01)

(58) Field of Classification Search
None
See application file for complete search history.

(56) References Cited

U.S. PATENT DOCUMENTS

| | | | | |
|---|---|---|---|---|
| 7,965,514 | B2 * | 6/2011 | Hill | H04M 1/0277 |
| | | | | 361/818 |
| 9,781,819 | B2 * | 10/2017 | Strader | H05K 1/0203 |
| 10,211,492 | B2 * | 2/2019 | Sakaguchi | H01M 10/623 |
| 10,404,309 | B2 * | 9/2019 | Basak | H04B 1/3888 |
| 2012/0044635 | A1 * | 2/2012 | Rothkopf | H05K 7/20445 |
| | | | | 700/145 |
| 2013/0250504 | A1 * | 9/2013 | Choi | G06F 1/203 |
| | | | | 361/679.26 |

(Continued)

FOREIGN PATENT DOCUMENTS

| | | | | |
|---|---|---|---|---|
| KR | 1020040059384 | | 7/2004 | |
| KR | 1020160063821 | | 6/2016 | |
| WO | WO-2015176592 | A1 * | 11/2015 | .......... H01M 10/613 |

OTHER PUBLICATIONS

Battery Pack and Battery Module Comprising Same, Nov. 26, 2015, computer translation of WO 2015176592 A1. (Year: 2022).*

*Primary Examiner* — Quoc D Tran
(74) *Attorney, Agent, or Firm* — Lee Hong Degerman Kang Waimey

(57) ABSTRACT

According to an embodiment, an electronic device includes a processor, a frame disposed at a rear side of the processor, a cylindrical battery disposed at a rear side of the frame, a composite sheet having at least one heat insulating member surrounding an outer peripheral surface of the cylindrical battery and at least one thermally conductive member surrounding the heat insulating member, and a heat sink disposed at a rear side of the composite sheet.

17 Claims, 5 Drawing Sheets

(56) References Cited

U.S. PATENT DOCUMENTS

2016/0013527 A1\* 1/2016 Rich ................... H01M 50/211
                                                    429/96
2018/0084680 A1\* 3/2018 Jarvis .................. H05K 1/0216

\* cited by examiner

ELECTRONIC DEVICE WITH CYLINDRICAL BATTERY

CROSS-REFERENCE TO RELATED APPLICATIONS

Pursuant to 35 U.S.C. § 119(a), this application claims the benefit of earlier filing date and right of priority to Korean Patent Application No. 10-2020-0061452, filed on May 22, 2020, the contents of which are all hereby incorporated by reference herein in its entirety.

BACKGROUND OF THE INVENTION

1. Field of the Invention

The present disclosure relates to heat dissipation of an electronic device having a cylindrical battery.

2. Discussion of the Related Art

An electronic device may be provided with a battery that supplies electricity to the electronic device.

The battery installed in the electronic device may be charged by a renewable power source or a charger, and may supply power required when using the electronic device.

On the other hand, when power is supplied to a printed circuit board (PCB), a processor, and the other chipset inside the electronic device, heat is generated. However, there is a problem in that the generated heat cannot effectively escape from the electronic device and degrade the performance of the electronic device.

As the battery continues to be used, the performance thereof deteriorates and the service life gradually decreases. Since the performance and aging of the battery may be significantly affected by heat generated inside the electronic device, it is preferable to provide a heat dissipation structure to maintain the performance of the battery.

SUMMARY OF THE INVENTION

An object of present disclosure is to provide an electronic device capable of minimizing overheating of a cylindrical battery.

Another object of the present disclosure is to provide an electronic device capable of maximizing the life of a cylindrical battery.

According to an embodiment of the present disclosure, an electronic device may include a processor, a frame disposed at a rear side of the processor, a cylindrical battery disposed at a rear side of the frame, a composite sheet having at least one heat insulating member surrounding an outer peripheral surface of the cylindrical battery and at least one thermally conductive member surrounding the heat insulating member, and a heat sink disposed at a rear side of the composite sheet.

The electronic device may further include an inner adhesive member disposed between the outer peripheral surface of the cylindrical battery and an inner peripheral surface of the heat insulating member.

The thermally conductive member may include a first thermally conductive member surrounding an outer peripheral surface of the heat insulating member; and a second thermally conductive member larger than the first thermally conductive member and surrounding an outer peripheral surface of the first thermally conductive member on outside of the first thermally conductive member.

The first thermally conductive member may have a higher thermal conductivity than that of the second thermally conductive member.

The second thermally conductive member may have a higher specific heat than that of the first thermally conductive member.

The composite sheet may include a first thermal tape disposed between the heat insulating member and the first thermally conductive member, and a second thermal tape disposed between the first thermally conductive member and the second thermally conductive member.

The frame may include a frame body disposed spaced apart from the cylindrical battery and surrounding a portion of an outer peripheral surface of the composite sheet, and at least one rib contacting the outer peripheral surface of the composite sheet.

The composite sheet may be spaced apart from the frame body.

The electronic device may further include a heat pipe disposed between the processor and the frame, a first thermal pad disposed between the processor and the heat pipe, and a second thermal pad disposed between the heat pipe and the frame.

The electronic device may further include an inner case disposed at a rear side of the composite sheet and surrounding a portion of the outer peripheral surface of the composite sheet.

The heat sink may have a width larger than an outer diameter of the composite sheet.

The electronic device may further include a thermal gel disposed between the outer peripheral surface of the composite sheet and one surface of the heat sink.

The thermal gel may have a width smaller than the outer diameter of the composite sheet.

The thermal gal has a width smaller than a width of the heat sink.

According to another embodiment of the present disclosure, an electronic device may include a frame to which heat of a heat source is transferred, a cylindrical battery disposed at a rear side of the frame, a composite sheet having at least one heat insulating member surrounding an outer peripheral surface of the cylindrical battery and at least one thermally conductive member surrounding the heat insulating member, and a heat sink disposed at a rear side of the composite sheet.

According to another embodiment of the present disclosure, an electronic device may include a front cover, a display disposed on the front cover, a rear case configured to define an inner space in cooperation with the front cover, a heat source accommodated in the space, a frame to which heat of the heat source is transferred, a cylindrical battery disposed at a rear side of the frame, a composite sheet having at least one heat insulating member surrounding an outer peripheral surface of the cylindrical battery and at least one thermally conductive member surrounding the heat insulating member, and a heat sink disposed between the composite sheet and the rear case to transfer heat to the rear case.

The electronic device may further include a camera accommodated in the space to be spaced apart from the heat source and the cylindrical battery.

The frame may include a frame body disposed spaced apart from the cylindrical battery and surrounding a portion of an outer peripheral surface of the composite sheet, and at least one rib contacting the outer peripheral surface of the composite sheet. The composite sheet may be spaced apart from the frame body.

The thermally conductive member may include a first thermally conductive member surrounding an outer peripheral surface of the heat insulating member, and a second thermally conductive member larger than the first thermally conductive member and surrounding an outer peripheral surface of the first thermally conductive member on outside of the first thermally conductive member.

The electronic device may further include a thermal gel disposed between the outer peripheral surface of the composite sheet and one surface of the heat sink.

DETAILED DESCRIPTION OF THE PREFERRED EMBODIMENTS

Exemplary embodiments of the present disclosure will be described below in detail with reference to the accompanying drawings in which the same reference numbers are used throughout this specification to refer to the same or like parts. In describing the present disclosure, a detailed description of known functions and configurations will be omitted when it may obscure the subject matter of the present disclosure.

Hereinafter, specific embodiments of the present disclosure will be described in detail with reference to the drawings.

Figure 1:
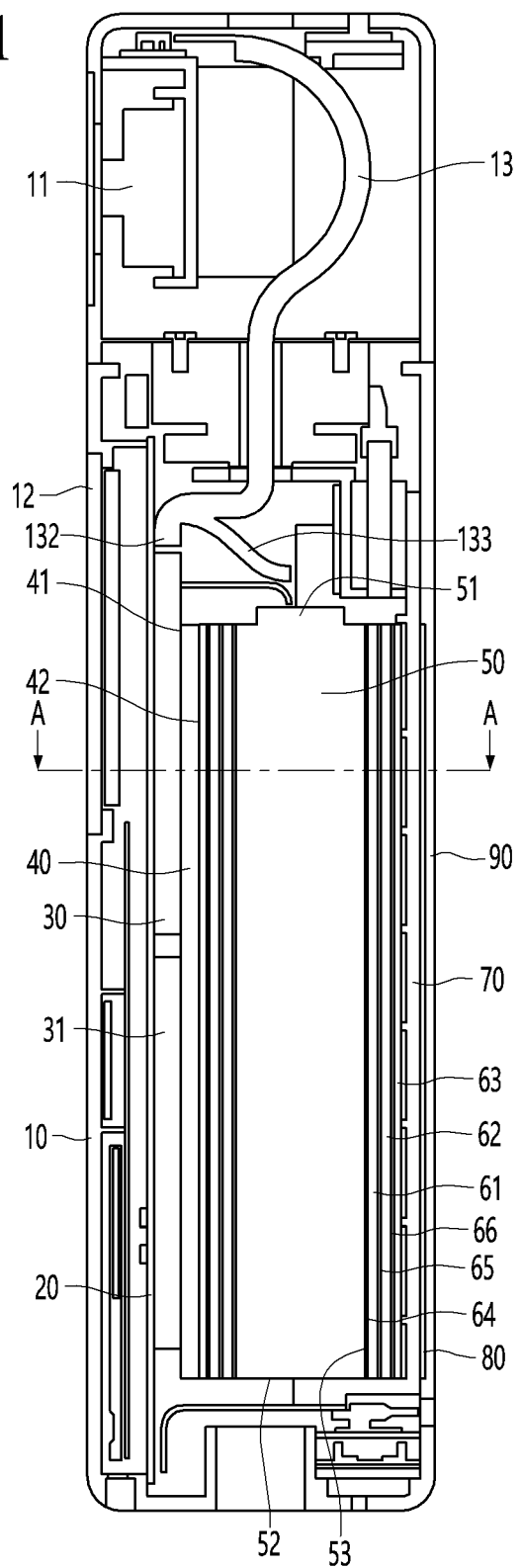
FIG. 1 is a cross-sectional view of an electronic device according to the present embodiment.

FIG. 1 is a cross-sectional view of an electronic device according to the present embodiment.

An electronic device 100 shown in FIG. 1 may include a front cover 10 forming one surface of the appearance of the electronic device 100, a display 12 disposed on the front cover 10, a rear case 90 to define an inner space in cooperation with the front cover 10.

The electronic device 100 may further include a heat source accommodated in the space, a frame 40 to which heat of the heat source is transferred, a cylindrical battery 50 disposed at a rear side of the frame 40, and a camera 11 accommodated in the space to be spaced apart from the heat source and the cylindrical battery 50.

The electronic device 100 may be a mobile device in which a cylindrical battery 50 may be used. For example, the electronic device 100 may be a camera such as an action camera, a device such as a display or a black box installed in a vehicle, or a communication device such as a smart phone or a modem.

The heat source may include a processor 30 and 31, a PCB 20, and at least one communication element 21 or 22. In this case, the processor 30 and 31 may include a hardware unit (e.g., a CPU or an application processor) that executes program in the electronic device 100. In addition, the PCB 20 may include a printed wiring board in which an electronic circuit is configured by fixing an electronic component such as an integrated circuit to a surface of the printed wiring board, and the communication component includes an electronic component using conductivity of electrons in a solid, including a passive element and an active element.

Each of a camera 11 accommodated in the space, the display 12 disposed on the front cover 10, and the cylindrical battery 50 disposed at a rear side of the frame 40 may be connected to a heat source, for example, the PCB 20 through a wire 13 provided in the space. The wire 13 may include a battery connection portion 133 for receiving power from the cylindrical battery 50 and a heat source connection portion 132 for transferring power to the heat source.

Meanwhile, the frame 40 may form a space in which the cylindrical battery 50 is accommodated in a space inside the electronic device 10 together with the rear case 90, and the front surface 41 of the frame 40 may be in contact with at least one processor 30 and 31.

The cylindrical battery 50 may be disposed between the frame 40 and the rear case 90. The appearance of the cylindrical battery 50 may be formed by the upper surface 51, the lower surface 52, and the outer peripheral surface 53, and the upper surface 51 and the lower surface 52 of the cylindrical battery 50 are preferably disposed in parallel. The outer peripheral surface 53 of the cylindrical battery 50 may connect the upper surface 51 and the lower surface 52.

A negative (−) pole of the battery may be disposed on the lower surface 52 of the cylindrical battery 50 and a positive (+) pole may be disposed on the upper surface 51 of the cylindrical battery 50.

The electronic device 100 may include a composite sheet 60 surrounding the outer peripheral surface 53 of the cylindrical battery 50. The composite sheet 60 may include at least one heat insulating member 61 and at least one thermally conductive member as a member for minimizing the transfer of heat from the frame 40 to the cylindrical battery 50.

Specifically, the electronic device 100 may include at least one heat insulating member 61 surrounding the outer peripheral surface 53 of the cylindrical battery 50, a composite sheet 60 having at least one thermally conductive member surrounding the heat insulating member 61, and a heat sink disposed between the composite sheet 60 and the rear case 90 to discharge heat to the rear case 90.

In this case, an inner adhesive member 64 is disposed between the outer peripheral surface 53 of the cylindrical battery 50 and the heat insulating member 61. One surface of the inner adhesive member 64 is in contact with the outer peripheral surface 53 of the cylindrical battery 50 and the other surface of the inner adhesive member 64 is in contact with the heat insulating member 61 to bond the outer peripheral surface 53 of the cylindrical battery 50 and the heat insulating member 61.

The composite sheet 60 may include a plurality of thermally conductive members 62 and 63.

In addition, a first thermal tape 65 is disposed between the heat insulating member 61 and the first thermally conductive member 62. One surface of the first thermal tape 65 is in contact with the heat insulating member 61, and the other surface of the first thermal tape 65 is in contact with the first thermally conductive member 62 to bond the heat insulating member 61 and the first thermally conductive member 62.

Further, a second thermal tape 66 is disposed between the first thermally conductive member 62 and the second thermally conductive member 63. One surface of the second thermal tape 66 is in contact with the first thermally conductive member 62, and the other surface of the second thermal tape 66 is in contact with the second thermally conductive member 63 to bond the first thermally conductive member 62 and the second thermally conductive member 63.

Figure 2:
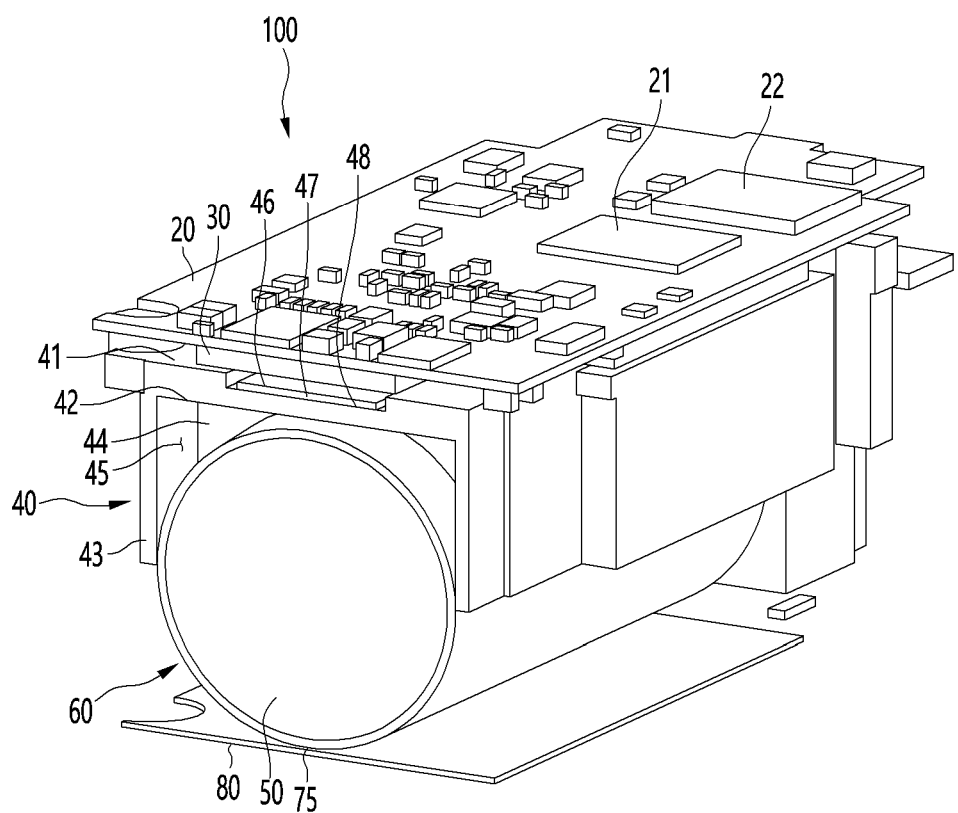
FIG. 2 is a partially cut-away perspective view showing the interior of an electronic device according to the present embodiment.
Figure 3:
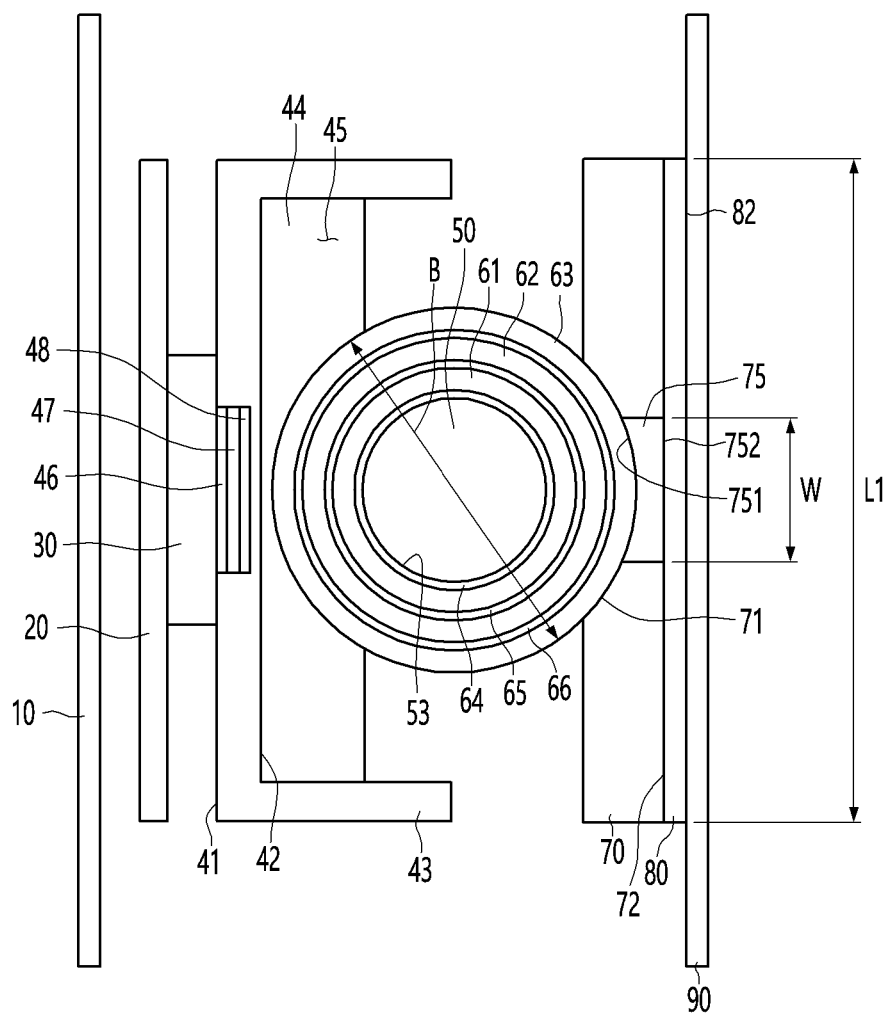
FIG. 3 is a cross-sectional view taken along line A-A shown in FIG. 1.
Figure 4:
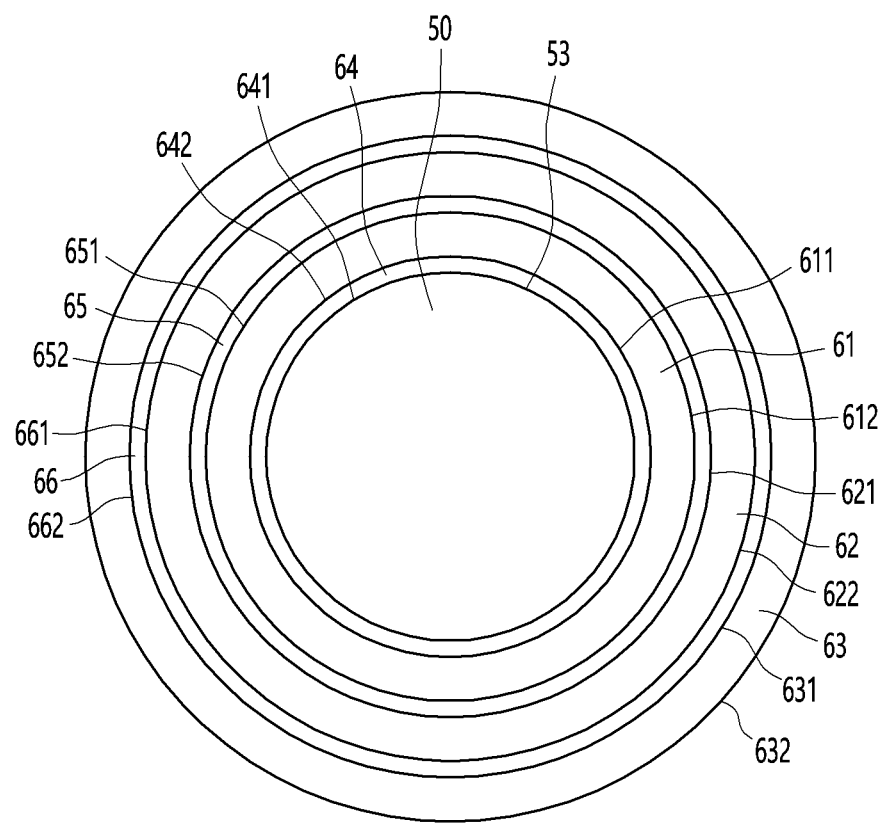
FIG. 4 is a cross-sectional view showing a composite sheet and a cylindrical battery according to the present embodiment

FIG. 2 is a partially cut-away perspective view showing the interior of an electronic device according to the present embodiment, FIG. 3 is a cross-sectional view taken along line A-A shown in FIG. 1, and FIG. 4 is a cross-sectional view showing a composite sheet and a cylindrical battery according to the present embodiment.

The processor 30 may be disposed in front of the frame 40, and the heat of the processor 30 may be transferred to the frame 40 disposed at a rear side of the processor 30.

Referring to FIGS. 2 and 3, the electronic device 100 may include a heat pipe 47 disposed between the processor 30 and the frame 40. The heat pipe 47 may be made of copper or aluminum having a high thermal conductivity, and may include a member capable of rapidly transferring heat by using a principle in which heat is conducted as the liquid having high thermal conductivity evaporates.

The heat pipe 47 may quickly transfer heat generated from the heat source to the frame 40. In this case, at least one thermal pad 46 and 48, which is a heat transfer intermediate medium for transferring heat to the processor 30, the heat pipe 47, and the frame 40 sequentially may be provided.

Specifically, a first thermal pad 46 is disposed between the processor 30 and the heat pipe 47, and a second thermal pad 48 is disposed between the heart pipe 47 and the frame 40.

In an embodiment of the present disclosure, the frame 40 may include a frame body 43 spaced apart from the cylindrical battery 50 to surround a portion of the outer peripheral surface 53 of the composite sheet 60 and at least one rib 44 contacting the outer peripheral surface 53 of the composite sheet 60.

The frame body 43 may form an appearance of the frame 40. The frame body 43 is disposed at the rear side of the processor 30, and the upper surface 41 of the frame 40 is preferably disposed in parallel with the processor 30. The cross-section of the frame body 43 may be formed to be bent in a shape of 'c' to surround a portion of the outer peripheral surface of the composite sheet 60. In this case, the outer peripheral surface of the composite sheet 60 may refer to an outer peripheral surface 632 of the second thermally conductive member 63 of the composite sheet 60.

Meanwhile, the frame body 43 does not directly contact the composite sheet 60, and the frame body 43 and at least a portion of the composite sheet 60 may be spaced apart from each other. Specifically, at least one surface of the frame 40 facing the composite sheet 60 may be spaced apart from the outer peripheral surface of the composite sheet 60. Since the frame body 43 is paced apart from the outer peripheral surface of the composite sheet 60, an air layer 45 may be formed between the frame body 43 and the composite sheet 60.

At least one rib 44 contacting the outer peripheral surface of the composite sheet 60 may be formed in at least one surface of the frame 40 facing the composite sheet 60. The rib 44 of the frame 40 may be seated on the outer peripheral surface of the composite sheet 60.

The electronic device 100 of the present disclosure may further include the heat sink 80. The heat sink 80 may be disposed at a rear side of the composite sheet 60. The rear surface 82 of the heat sink 80 may be in contact with the rear case 90. The heat sink 80 may transfer heat transferred from the composite sheet 60 to the rear case 90.

In one embodiment of the present disclosure, the heat sink 80 may absorb heat conducted from the composite sheet 60 and dissipate the absorbed heat in the direction of the rear case 90.

In addition, the electronic device 100 of the present disclosure may further include the inner case 70 disposed at the rear side of the composite sheet 60 and surrounding a portion of the outer peripheral surface of the composite sheet 60.

The inner case 70 may support the composite sheet 60 and may include a seating surface 71 on which the composite sheet 60 is seated and a contact surface 72 in contact with the heat sink 80. It is preferable that the seating surface 71 has the same curvature as the outer peripheral surface of the composite sheet 60, and the whole contact surface 72 is made of a flat surface.

The electronic device 100 of the present disclosure may include a thermal gel 75 disposed between the outer peripheral surface of the composite sheet 60 and one surface of the heat sink 80. In this case, the thermal gel 75 is a fluid material having a high thermal conductivity and is disposed between the composite sheet 60 and the heat sink 80 to uniformly conduct heat to the heat sink 80.

In the electronic device 100, the outer peripheral surface of the composite sheet 60 may directly contact one surface of the heat sink 80 and therefore, heat of the composite sheet 60 can be transferred to the heat sink 80 without the thermal gel 75.

In the electronic device 100, it is preferable that heat of the composite sheet 60 is rapidly transferred to the heat sink 80. When the thermal gel 75 is in surface contact with the composite sheet 60 and the heat sink 80, heat may be transferred to the heat sink 80 more quickly.

The thermal gel 75 includes a curved portion 751 contacting a portion of the outer peripheral surface of the composite sheet 60 and a flat portion 752 contacting the heat sink 80 and is formed to surround a portion of the outer peripheral surface of the composite sheet 60.

In addition, the width "W" of the thermal gel 75 may be smaller than the outer diameter "B" of the composite sheet 60. The width "W" of the thermal gel 75 may be smaller than the width L1 of the heat sink 80.

Since the width L1 of the heat sink 80 is greater than the width W of the thermal gel 75 as described above, the heat conducted from the thermal gal 75 is quickly discharged to the outside due to the large heat dissipation area of the heat sink 80.

In addition, the width L1 of the heat sink 80 may be larger than the outer diameter "B" of the composite sheet 60.

Hereinafter, the cylindrical battery 50 and the composite sheet 60 will be described in detail.

Referring to FIG. 4, the electronic device 100 of the present disclosure may include at least one heat insulating member 61 surrounding the outer peripheral surface of the cylindrical battery 50. In this case, the heat insulating member 61 is made of a material having a low thermal conductivity and may function to block heat that is conducted from the outside to the cylindrical battery 50.

An inner adhesive member 64 may be disposed between the outer peripheral surface 53 of the cylindrical battery 50 and the inner peripheral surface 611 of the heat insulating member 61. In this case, the inner adhesive member 64 is made of adhesive to bond the cylindrical battery 50 and the heat insulating member 61.

The composite sheet 60 of the present disclosure includes at least one thermally conductive member, and the thermally conductive member may include a first thermally conductive member 62 surrounding the outer peripheral surface 612 of the heat insulating member 61 and a second thermally conductive member 63 larger than the first thermally conductive member 62 and surrounding the outer peripheral surface 622 of the first thermally conductive member 62 on the outside of the first thermally conductive member 62.

Further, the composite sheet 60 may include a first thermal tape 65 disposed between the first heat insulating member 61 and the first thermally conductive member 62 and a second thermal tape 66 disposed between the first thermally conductive member 62 and the second thermally conductive member 63.

In this case, each of the first thermal tape 65 and the second thermal tape 66 may have at least one surface having adhesive force and may be formed of a material for heat transfer.

Further, the first thermally conductive member 62 and the second thermally conductive member 63 may be used as a member for transferring the heat of the composite sheet 60 to another portion.

There is an example in which the first thermally conductive member 62 and the second thermally conductive member 63 may have the same thermal conductivity or the same specific heat. For example, the first thermally conductive member 62 and the second thermally conductive member 63 may have a graphite sheet (thermal conductivity of approximately 500 to 1400 W/mk) having thermal anisotropy with a large thermal conductivity in the plane direction compared to the thickness direction.

There is another example in which the first thermally conductive member 62 and the second thermally conductive member 63 each may include a sheet made of a material having an isotropic thermal conductivity such as copper (thermal conductivity of about 390 W/mk) or aluminum (thermal conductivity of about 240 W/mk).

On the other hand, the electronic device 100 is preferably configured to quickly transfer the heat of the composite sheet 60 to the heat sink 80. The graphite sheet has a larger thermal conductivity in the plane direction when compared to a material such as copper. However, a separate protective film may be required because there is a possibility that the graphite sheet generates dust when used, and the graphite sheet may be easily damaged because its durability is weaker than that of the copper sheet.

Therefore, the composite sheet 60 of the present disclosure is preferably configured by arranging a plurality of thermally conductive members to compensate for the above drawbacks by using sheets having different thermal conductivity or specific heat together as the first thermally conductive member 62 and the second thermally conductive member 63.

For example, the first thermally conductive member 62 may be made of a graphite sheet, and the second thermally conductive member 63 may be made of a copper sheet. That is, the thermal conductivity of the first thermally conductive member 62 may be higher than that of the second thermally conductive member 63.

Specifically, the thermal conductivity of the first thermally conductive member 62 is greater than that of the second thermally conductive member 63 in the plane direction, and the thermal conductivity of the second thermally conductive member 63 may be greater than that of the first thermally conductive member 62 in the thickness direction.

The specific heat of the second thermally conductive member 63 may be higher than the specific heat of the first thermally conductive member 62 based on the material properties of the thermally conductive members.

As described above, the composite sheet 60 may be formed using the first thermally conductive member 62 and the second thermally conductive member 63 that have different thermal conductivities together, thus compensating for the drawbacks of the thermally conductive members and enabling the heat of the composite sheet 60 to be quickly conducted to the heat sink 80.

Meanwhile, the composite sheet 60 is not limited to a configuration in which the first thermally conductive member 62 and the second thermally conductive member 63 are different in thermal conductivity or specific heat, and the first thermally conductive member 62 and the second thermally conductive member 63 may have the same thermal conductivity or specific heat. In addition, the composite sheet 60 is not limited to a configuration including both the first thermally conductive member 62 and the second thermally conductive member 63, and the composite sheet 60 may include only the first thermally conductive member 62 without the second thermally conductive member 63.

Figure 5:
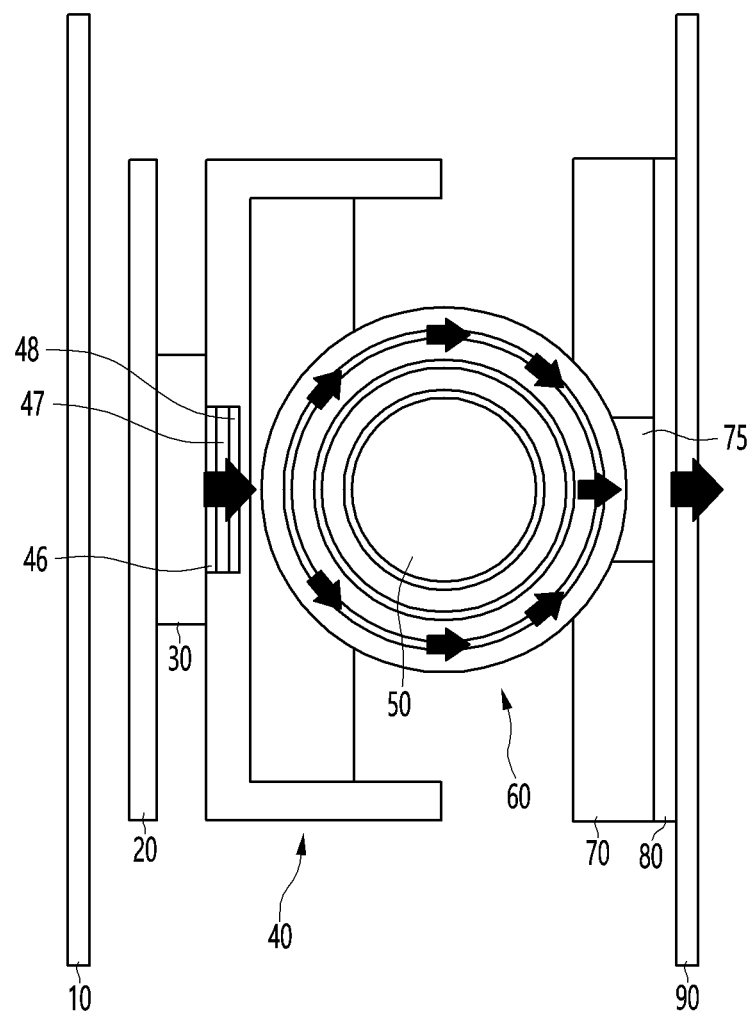
FIG. 5 is a view showing a heat dissipation path of the processor of the present embodiment taken along the line A-A shown in FIG. 1.

FIG. 5 is a view showing a heat dissipation path of the processor of the present embodiment taken along the line A-A shown in FIG. 1.

The operation of the present disclosure configured as described above will be described below.

Referring to FIG. 5, when an electronic device is used, heat may be released from a heat source including a processor 30, a PCB 20 and at least one communication element 21 and 22, and the heat may be transferred to a heat pipe 47 through a first thermal pad 46 and the heat of the heat pipe 47 may be transferred to a frame 40 through a second thermal pad 48. The heat transferred to the frame 40 is transferred to the composite sheet 60 through at least one rib 44, and a first thermally conductive member 62 and a second thermally conductive member 63 included in the composite sheet 60 transfer the heat conducted through the composite sheet 60 to a heat sink 80. A heat insulating member 61 disposed on the inner peripheral surface of the composite sheet 60 may minimize the transfer of the heat transferred through the first thermally conductive member 62 and the second thermally conductive member 63 to a cylindrical battery 50.

The heat conducted to the composite sheet 60 may be transferred to the heat sink 80 through a thermal gel 75, and the heat sink 80 has a larger heat dissipation area than the thermal gel 75, thereby effectively releasing heat to a rear case 90.

According to an embodiment of the present disclosure, heat of a processor may be transferred to a heat sink through the composite sheet around the cylindrical battery while minimizing heat transfer to the cylindrical battery, and performance degradation of the cylindrical battery may be minimized.

In addition, the composite sheet may prevent the damage to the cylindrical battery from the outside of the cylindrical battery.

In addition, the thermally conductive member surrounding the heat insulating member may protect the heat insulating member from damage.

In addition, since the first and second thermally conductive members are different in the thermal conductivity or specific heat, it is possible to maximize the heat transfer efficiency of the composite sheet.

In addition, an air layer is formed between the frame body and the outer peripheral surface of the composite sheet to minimize heat transfer from the processor to the cylindrical battery, thereby minimizing the performance degradation of the cylindrical battery.

In addition, the inner case supports a part of the outer peripheral surface of the composite sheet, thus enabling the cylindrical battery to be stably seated in the electronic device.

In addition, it is possible to effectively minimize damage to the cylindrical battery due to the heat of the processor by placing a thermal gal between the outer peripheral surface of the composite sheet and the heat sink.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments.

The scope of the present disclosure should be construed on the basis of the accompanying claims, and all the technical ideas within the scope equivalent to the claims should be included in the scope of the present disclosure.

What is claimed is:

1. An electronic device comprising:
    a processor;
    a frame disposed at a rear side of the processor;
    a cylindrical battery disposed at a rear side of the frame;
    a composite sheet including:
        at least one heat insulating member surrounding an outer peripheral surface of the cylindrical battery; and
        at least one thermally conductive member surrounding the at least one heat insulating member; and
    a heat sink disposed at a rear side of the composite sheet,
    the frame having a heat pipe and the heat sink having a thermal gel,
    the frame and the heat sink being disposed to face each other with the cylindrical battery interposed therebetween, and
    the heat pipe and the thermal gel are arranged on a same line with the cylindrical battery interposed therebetween,
        wherein the at least one thermally conductive member includes:
        a first thermally conductive member surrounding an outer peripheral surface of the at least one heat insulating member, and
        a second thermally conductive member larger than the first thermally conductive member and surrounding an outer peripheral surface of the first thermally conductive member, and
        wherein the thermal conductivity of the first thermally conductive member is greater than that of the second thermally conductive member in a plane direction, and
    the thermal conductivity of the second thermally conductive member is greater than that of the first thermally conductive member in a thickness direction.

2. The electronic device of claim 1, further comprising:
    an inner adhesive member disposed between the outer peripheral surface of the cylindrical battery and an inner peripheral surface of the at least one heat insulating member.

3. The electronic device of claim 1, wherein the composite sheet further includes:
    a first thermal tape disposed between the at least one heat insulating member and the first thermally conductive member; and
    a second thermal tape disposed between the first thermally conductive member and the second thermally conductive member.

4. The electronic device of claim 1, wherein the frame includes:
    a frame body spaced apart from the cylindrical battery and surrounding a portion of an outer peripheral surface of the composite sheet; and
    at least one rib contacting the outer peripheral surface of the composite sheet.

5. The electronic device of claim 4, wherein the composite sheet is spaced apart from the frame body.

6. The electronic device of claim 1, further comprising:
    a first thermal pad disposed between the processor and the heat pipe; and
    a second thermal pad disposed between the heat pipe and the frame.

7. The electronic device of claim 1, further comprising:
    an inner case disposed at a rear side of the composite sheet and surrounding a portion of an outer peripheral surface of the composite sheet.

8. The electronic device of claim 1, wherein the heat sink has a width larger than an outer diameter of the composite sheet.

9. The electronic device of claim 1,
    wherein the thermal gel is disposed between an outer peripheral surface of the composite sheet and one surface of the heat sink.

10. The electronic device of claim 9, wherein the thermal gel has a width smaller than an outer diameter of the composite sheet.

11. The electronic device of claim 9, wherein the thermal gel has a width smaller than a width of the heat sink.

12. An electronic device comprising:
    a frame to which heat of a heat source is transferred;
    a cylindrical battery disposed at a rear side of the frame;
    a composite sheet including:
        at least one heat insulating member surrounding an outer peripheral surface of the cylindrical battery; and
        at least one thermally conductive member surrounding the at least one heat insulating member; and
    a heat sink disposed at a rear side of the composite sheet,
    the frame having a heat pipe and the heat sink having a thermal gel,
    the frame and the heat sink being disposed to face each other with the cylindrical battery interposed therebetween, and
    the heat pipe and the thermal gel are arranged on a same line with the cylindrical battery interposed therebetween,
    wherein the at least one thermally conductive member includes:
    a first thermally conductive member surrounding an outer peripheral surface of the at least one heat insulating member, and
    a second thermally conductive member larger than the first thermally conductive member and surrounding an outer peripheral surface of the first thermally conductive member, and
    wherein the thermal conductivity of the first thermally conductive member is greater than that of the second thermally conductive member in a plane direction, and the thermal conductivity of the second thermally conductive member is greater than that of the first thermally conductive member in a thickness direction.

13. An electronic device comprising:
a front cover;
a display disposed on the front cover;
a rear case configured to define an inner space with the front cover;
a heat source accommodated in the inner space;
a frame to which heat of the heat source is transferred;
a cylindrical battery disposed at a rear side of the frame;
a composite sheet including:
  at least one heat insulating member surrounding an outer peripheral surface of the cylindrical battery; and
  at least one thermally conductive member surrounding the at least one heat insulating member; and
a heat sink disposed between the composite sheet and the rear case to transfer heat to the rear case,
the frame having a heat pipe and the heat sink having a thermal gel,
the frame and the heat sink being disposed to face each other with the cylindrical battery interposed therebetween, and
the heat pipe and the thermal gel are arranged on a same line with the cylindrical battery interposed therebetween,
wherein the at least one thermally conductive member includes:
a first thermally conductive member surrounding an outer peripheral surface of the at least one heat insulating member, and
a second thermally conductive member larger than the first thermally conductive member and surrounding an outer peripheral surface of the first thermally conductive member, and wherein the thermal conductivity of the first thermally conductive member is greater than that of the second thermally conductive member in a plane direction, and
the thermal conductivity of the second thermally conductive member is greater than that of the first thermally conductive member in a thickness direction.

14. The electronic device of claim 13, further comprising:
a camera accommodated in the inner space to be spaced apart from the heat source and the cylindrical battery.

15. The electronic device of claim 13, wherein the frame includes:
a frame body spaced apart from the cylindrical battery and surrounding a portion of an outer peripheral surface of the composite sheet; and
at least one rib contacting the outer peripheral surface of the composite sheet, and
wherein the composite sheet is spaced apart from the frame body.

16. The electronic device of claim 13, wherein the at least one thermally conductive member includes:
a first thermally conductive member surrounding an outer peripheral surface of the at least one heat insulating member; and
a second thermally conductive member larger than the first thermally conductive member and surrounding an outer peripheral surface of the first thermally conductive member.

17. The electronic device of claim 13,
wherein the thermal gel is disposed between an outer peripheral surface of the composite sheet and one surface of the heat sink.

* * * * *